W. G. WEATHERLY.
PUMP.
APPLICATION FILED SEPT. 18, 1916.
1,234,587.
Patented July 24, 1917.
3 SHEETS—SHEET 3.
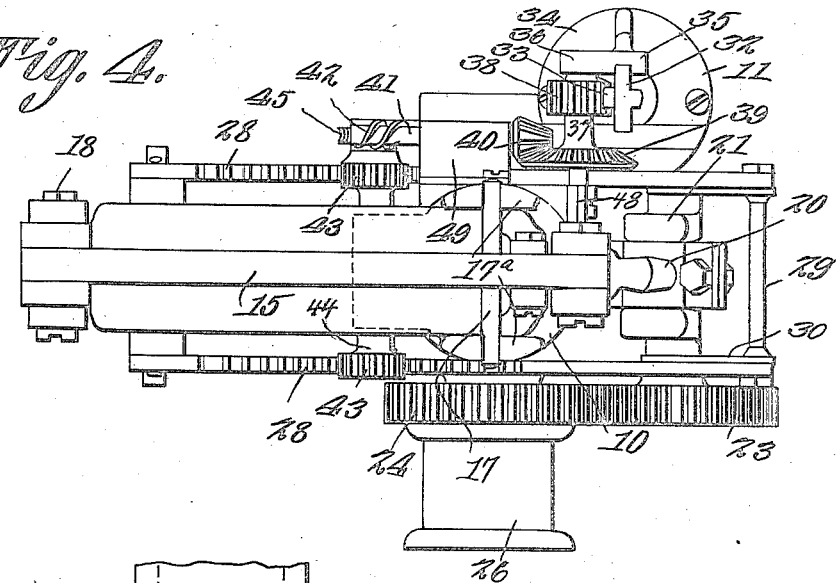
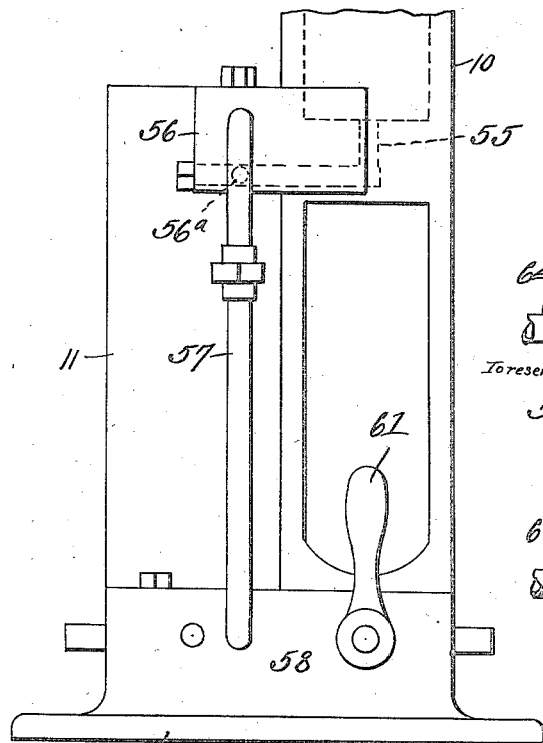
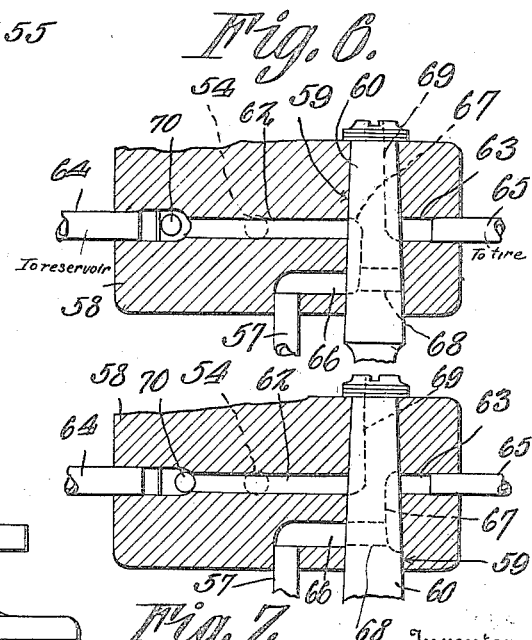
Inventor
William G. Weatherly
By Max A. Schmidt
Attorney

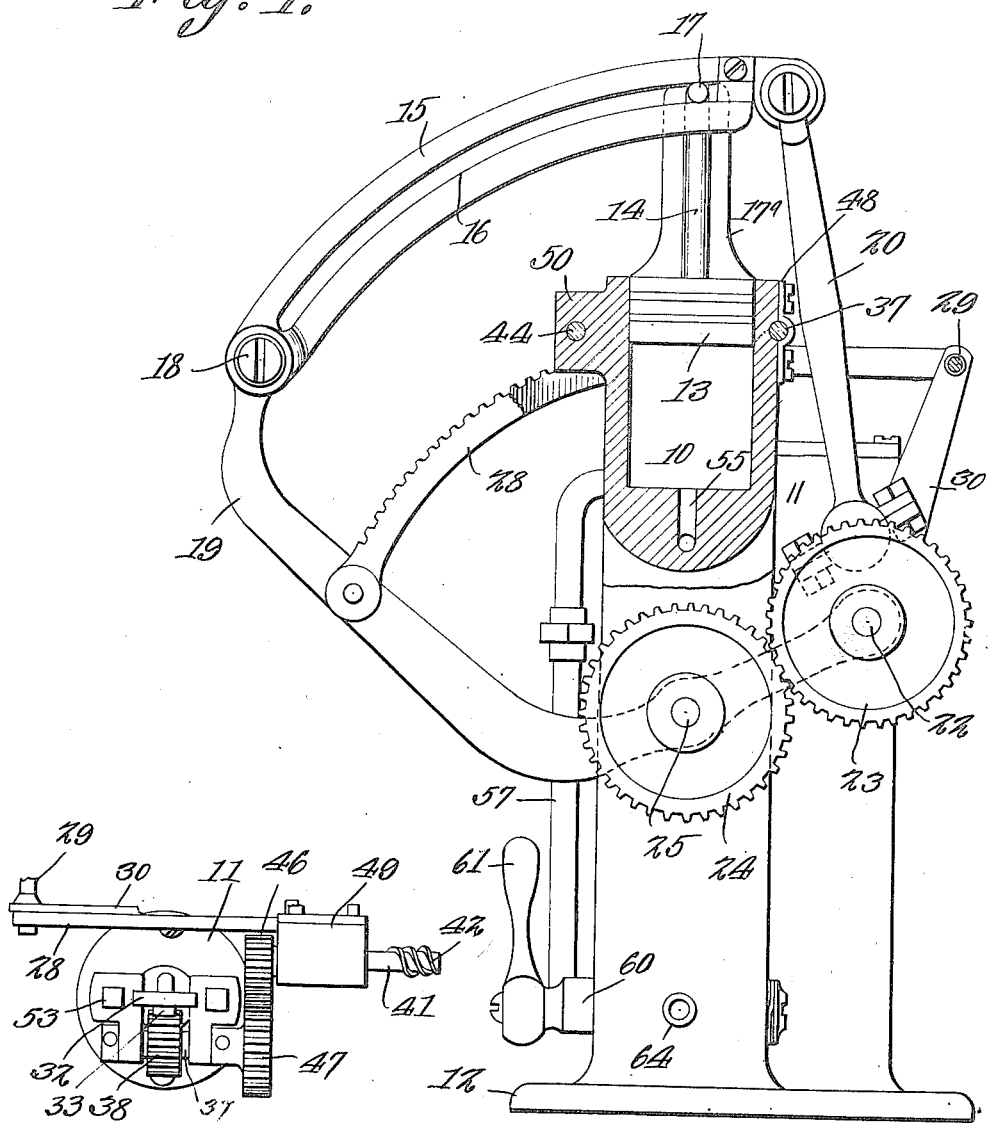

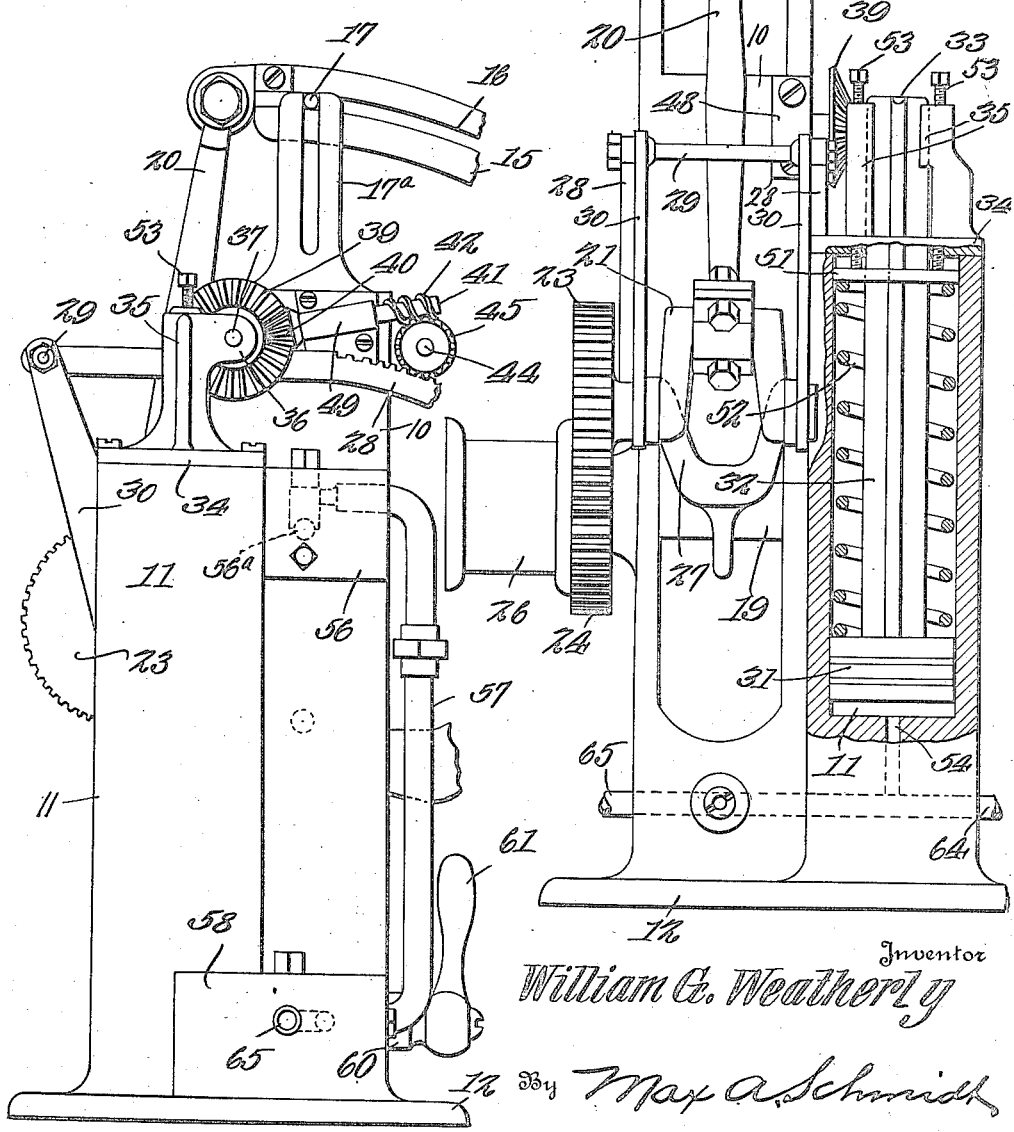

UNITED STATES PATENT OFFICE.

WILLIAM G. WEATHERLY, OF PEOLA, WASHINGTON.

PUMP.

1,234,587. Specification of Letters Patent. Patented July 24, 1917.

Application filed September 18, 1916. Serial No. 120,734.

*To all whom it may concern:*

Be it known that I, WILLIAM G. WEATHERLY, a citizen of the United States, residing at Peola, in the county of Garfield and State of Washington, have invented certain new and useful Improvements in Pumps, of which the following is a specification.

The pump which is the subject matter of the present application for patent is designed more particularly for use in connection with automobiles for inflating tires and other work requiring compressed air, the pump, however, being also adapted for heavy duty work where an air compressor is needed.

The invention has for its object to provide a novel and improved means for regulating the pump, such means being entirely automatic and being governed by the air pressure.

A further object of the invention is to provide a novel and improved valve mechanism for distributing the air and facilitating its use for the purpose desired.

With the objects stated in view, the invention consists in a combination and arrangement of parts to be hereinafter described and claimed, and in order that the same may be better understood, reference is had to the accompanying drawings forming a part of this specification.

In the drawings—

Figure 1 is an elevation of the pump, partly in section, and parts broken away; Fig. 2 is an elevation of the opposite side of the pump, with parts broken away; Fig. 3 is an end elevation, partly in section; Fig. 4 is a plan view; Fig. 5 is an elevation of the cylinder casting; Figs. 6 and 7 are sectional views of a valve, and Fig. 8 is a plan view showing a modification.

Referring specifically to the drawings, 10 denotes the cylinder of the pump and 11 the cylinder of a regulating device. These two cylinders may be cast integral and they are provided with a suitable base 12.

In the cylinder 10 works a reciprocatory plunger 13 provided with a stem or rod 14 having a connection with a link 15 which has a curved slot 16. A sliding connection between the plunger rod and the link is provided, the rod having a T-head 17 which seats in the slot 16. This connection is provided in order that the link may be shifted relative to the plunger rod to vary the stroke of the pump plunger. From the top of the cylinder rise guides 17ª for the T-head 17. The link is fulcrumed at one end, as shown at 18, to one end of an arm 19, and to the other end of the link is connected a rod 20 attached to a crank 21 on the shaft 22 to which latter is fast a gear 23 which is in mesh with a gear 24 loose on a shaft 25 provided with a pulley 26 or other suitable means for receiving motion from a power source. The link is rocked by the connecting rod 20, and through the stem 14 the plunger 13 is reciprocated in the cylinder 10.

The arm 19 serves as the fulcrum of the link 15 and it is pivoted intermediate its ends on the shaft 25. The end of the arm 19, opposite the end to which the link 15 is connected, is forked, as shown at 27, and carries the shaft 22, the crank 21 of said shaft being positioned between the fork branches.

To the arm 19, between the fulcrum 25 thereof and the end which is connected to the link 15, is attached one end of a pair of curved, parallel racks 28, the other ends of which latter are connected by a cross rod 29. To the last mentioned ends of the racks are also connected, by the rod 29, two supporting arms or braces 30 which are carried by and pivoted to the forked end 27 of the arm 19.

In the cylinder 11 is mounted a reciprocatory plunger 31 having a rod 32 provided at its outer end with a rack 33. On the head 34 closing the outer end of the cylinder 11 are guides 35 for the rack 33. These guides have a bearing 36 supporting one end of a shaft 37 on which is fast a pinion 38 which meshes with the rack 33. On the shaft 37 is also fast a bevel gear 39 which is in mesh with a bevel pinion 40 on a shaft 41 provided with a worm 42. With each rack 28 meshes a pinion 43 fast on a shaft 44 provided with a worm wheel 45 which is in mesh with the worm 42. By means of this gearing the racks 28 are moved in the direction of their length when the plunger 31 moves in the cylinder 11, and as the racks are connected to the arm 19 and the latter is connected to the link 15, it will be seen that the latter is also shifted in the direction of its length.

Fig. 8 shows a slightly modified form of gearing for shifting the link 15. Here, the pinion shaft 37 is connected to the worm shaft 41 by spur gears 46 and 47. The worm gearing in each structure will prevent the arm 19 from oscillating while the pump is in action, and also prevent all undue and racking motion.

The shaft 37 is also supported by a bearing 48 on the cylinder casting, and on the latter is also a bearing 49 supporting the worm shaft 41. The shaft 44 is supported in a bearing 50 on the cylinder casting.

In the cylinder 11, beneath the head 34 thereof, is a plate 51, and between this plate and the back of the plunger 31 is a spring 52, the latter being coiled around the plunger rod 32. This spring opposes the upward movement of the plunger when pressure is let into the cylinder 11 beneath the plunger. The tension of the spring may be regulated by adjusting screws 53 threaded through the cylinder head 34 and engaging the plate 51. The fluid pressure inlet port of the cylinder is shown at 54, the same being at the bottom and beneath the plunger.

The pump cylinder 10 has a bottom outlet port 55 leading into a receiving chamber 56 and provided with a check valve 56ª. From this chamber a delivery pipe 57 extends to a valve casing 58. In the valve casing is a bore 59 in which seats a rotary valve 60 in the form of a tapered plug having a suitable operating handle 61. In the valve casing are also two opposite passages 62 and 63, respectively. These two passages lead from the bore 59 and open through the ends of the valve casing. The passage 62 has a suitable connection 64 with a compressed air receiver or reservoir, and the passage is designed for a suitable connection 65 with the vehicle tire to be inflated. The valve casing also has a passage 66 which opens at one end into the bore 59 and has connected to its other end the delivery pipe 57. In the side of the valve plug 60 is a longitudinal groove 67 from one end of which a port 68 extends transversely through the plug. The side of the plug also has a longitudinal groove 69 which opens through one end thereof into the atmosphere. The air inlet 54 of the cylinder 11 leads from the passage 62.

When the reservoir is to be charged, the valve plug 60 is turned as shown in Fig. 6. The groove 67 now laps the passages 62 and 66, the air entering the latter passage flows along the groove into the passage 62 and to the reservoir connection 64. The air also flows through the inlet 54 to the regulator cylinder 11. In this position of the valve plug the connection 65 is cut off from the pump. If a tire is to be pumped up, the valve plug is turned to the position shown in Fig. 7. One end of the port 68 now registers with the passage 66 and one end of the groove 67 laps the passage 63. Air now flows through the port 68 and along the groove 67 into the passage 63, and thence by the connection 65 to the tire.

In the last-described position of the valve plug 60 the groove 69 acts as a release port as it laps the passage 62 and opens the same to the atmosphere, thus exhausting the air pressure from the regulator cylinder 11. The air, however, does not escape from the reservoir as the passage 62 has a check valve 70. When pumping up a tire a great volume of air is necessary, in view of which the pressure is released from the cylinder 11 so that the plunger 31 may descend to position the link 15 where it imparts a maximum stroke to the pump plunger 13.

The automatic regulator operates in the following manner:

When the cylinder 11 is connected to the pump outlet as hereinbefore described, the air pressure against the plunger 31 forces the same upward, and through the gearing and other connections with the link 15, the latter is drawn over to bring the T-head 17 closer to the pivoted end of the link, whereby the stroke of the pump plunger 13 is correspondingly shortened. By setting the spring 52 to a predetermined pressure, the stroke of the pump plunger is automatically shortened when this pressure is exceeded, and when the pressure drops, the stroke is increased by the return movement of the plunger 31 due to the pressure of the spring 52 thereagainst. The stroke of the pump plunger is therefore proportionate to the pressure, the stroke being greatest when the T-head 17 is at the end of the link to which the connecting rod 20 is attached, and the shortest stroke being when the T-head is at the opposite end of the link.

While the preferred embodiment of the invention has been shown, it will be evident that various changes and modifications may be made without a departure from the spirit and scope of the invention as claimed hereinafter.

Suitable provisions can be made for air or water cooling, and the entire apparatus may be housed in a protecting case. The pump can be used either with or without the regulator, and besides having a base, it is compact and rigid, as the entire driving and controlling means are carried by the cylinder casting.

I claim:

1. The combination of a pump cylinder, a plunger working in the cylinder, a rod carrying the plunger, a pivoted link having a sliding connection with the plunger rod, means for swinging the link, said means including a shaft, a swinging member carrying the shaft, to which member the link is pivoted, a shaft carrying the swinging member, means carried by the last-mentioned shaft for driving the first-mentioned shaft, and means connected to the swinging member and governed by the pump pressure for swinging said member to shift the link in the direction of its length.

2. The combination of a pump cylinder, a plunger working in the cylinder, a rod carrying the plunger, a pivoted link having a sliding connection with the plunger rod, means for swinging the link, a swinging support to which the link is pivoted, a rack connected to the support for swinging the same to shift the link in the direction of its length, and means governed by the pump pressure for actuating the rack.

3. The combination of a pump cylinder, a plunger working in the cylinder, a rod carrying the plunger, a pivoted link having a sliding connection with the plunger rod, means for swinging the link, a swinging support to which the link is pivoted, a rack connected to the support for swinging the same to shift the link in the direction of its length, a gear for actuating the rack, and driving means for said gear governed by the pump pressure.

4. The combination of a pump cylinder, a plunger working in the cylinder, a rod carrying the plunger, a pivoted link having a sliding connection with the plunger rod, means for swinging the link, a swinging support to which the link is pivoted, a rack connected to the support for swinging the same to shift the link in the direction of its length, a gear for actuating the rack, a shaft carrying said gear, a worm driving gear for said shaft, and actuating means for the driving gear governed by the pump pressure.

5. The combination of a pump cylinder, a plunger working in the cylinder, a rod carrying the plunger, a pivoted link having a sliding connection with the plunger rod, means for swinging the link, a swinging support to which the link is pivoted, means connected to the support for swinging the same to shift the link in the direction of its length, a gear for actuating said means, and driving means for said gear governed by the pump pressure.

6. The combination of a pump cylinder, a plunger working in the cylinder, a rod carrying the plunger, a pivoted link having a sliding connection with the plunger rod, means for swinging the link, a swinging support to which the link is pivoted, means connected to the support for swinging the same to shift the link in the direction of its length, a gear for actuating said means, a shaft carrying said gear, a worm driving gear for said shaft, and actuating means for the driving gear governed by the pump pressure.

7. The combination of a pump cylinder, a plunger working in the cylinder, a rod carrying the plunger, a pivoted link having a sliding connection with the plunger rod, a swinging support to one end of which the link is pivoted, a crank shaft carried by the other end of the support, a connecting rod between the crank shaft and the link, driving means for the crank shaft, a rack connected at one end to the support, braces supporting the other end of the rack, said braces being carried by the end of the support which carries the crank shaft, and means governed by the pump pressure for actuating the rack to swing the support and shift the link in the direction of its length.

8. The combination of a pump, means governed by the pump pressure for regulating the operation of the pump, said means including a cylinder and a plunger therein exposed to the pump pressure, a valve casing having a bore and separate outlet passages leading from the bore, said casing also having an inlet opening into the bore and connected to the pump outlet, one of the first mentioned passages being connected to the inlet of the aforesaid cylinder, and a valve in the aforesaid bore, said valve having a side groove positioned to lap the inlet opening and the last mentioned passage in one position, and a transverse port extending through the valve from one end of the groove, said groove lapping the other one of the aforesaid passages, and the port registering with the inlet in another position of the valve, said valve also having a release port opening to the atmosphere and lapping the first mentioned passage when the valve is in the last mentioned position.

In testimony whereof I affix my signature in the presence of two witnesses.

WILLIAM G. WEATHERLY.

Witnesses:
J. H. WEATHERLY,
E. E. SAUZE.